June 12, 1934.　　　　　C. O. WILSON　　　　　1,962,543
DIE STRUCTURE
Filed June 9, 1933　　　3 Sheets-Sheet 1
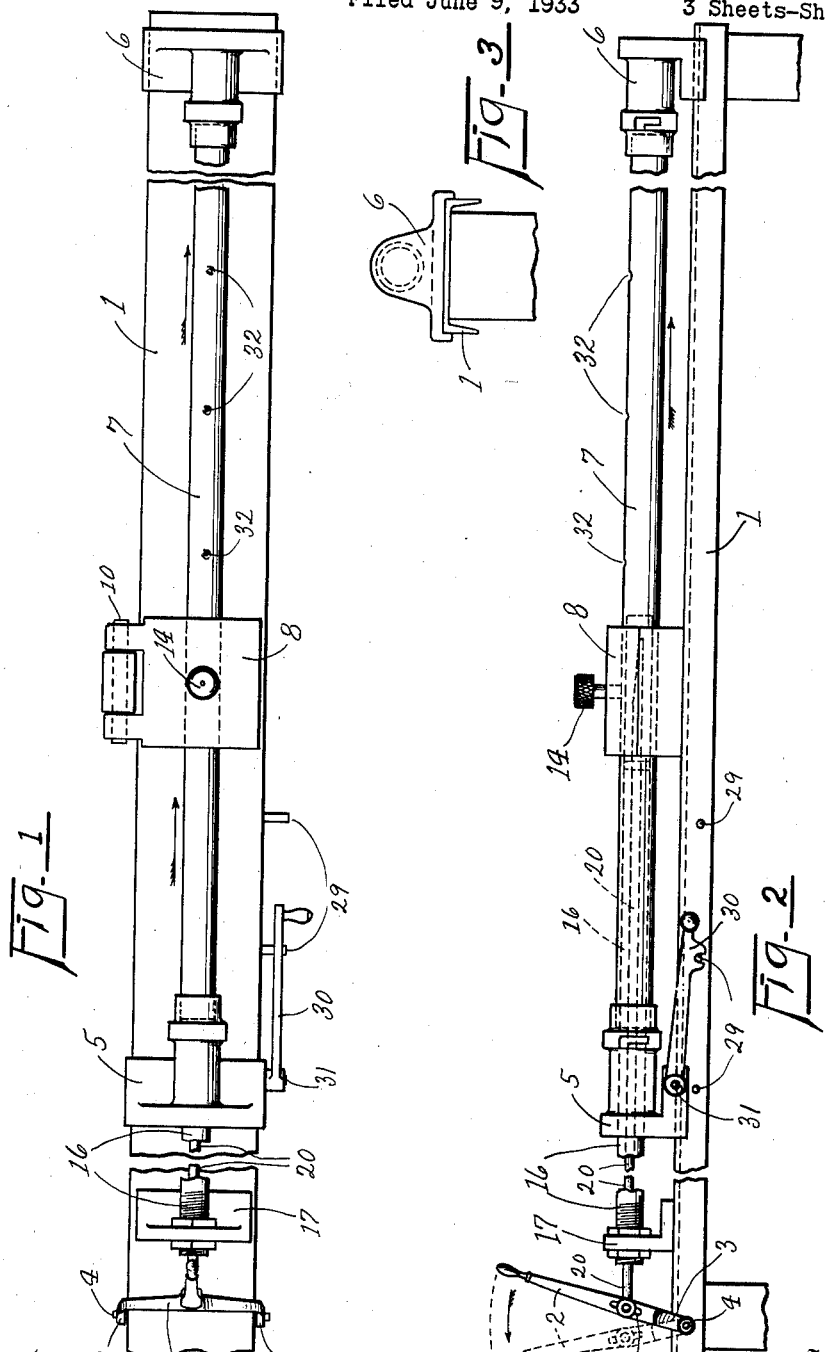
Witness:
Geo L. Chapel
Inventor
Charles O. Wilson
By Rice and Rice
Attorneys June 12, 1934.　　　　C. O. WILSON　　　　1,962,543
DIE STRUCTURE
Filed June 9, 1933　　　　3 Sheets-Sheet 2
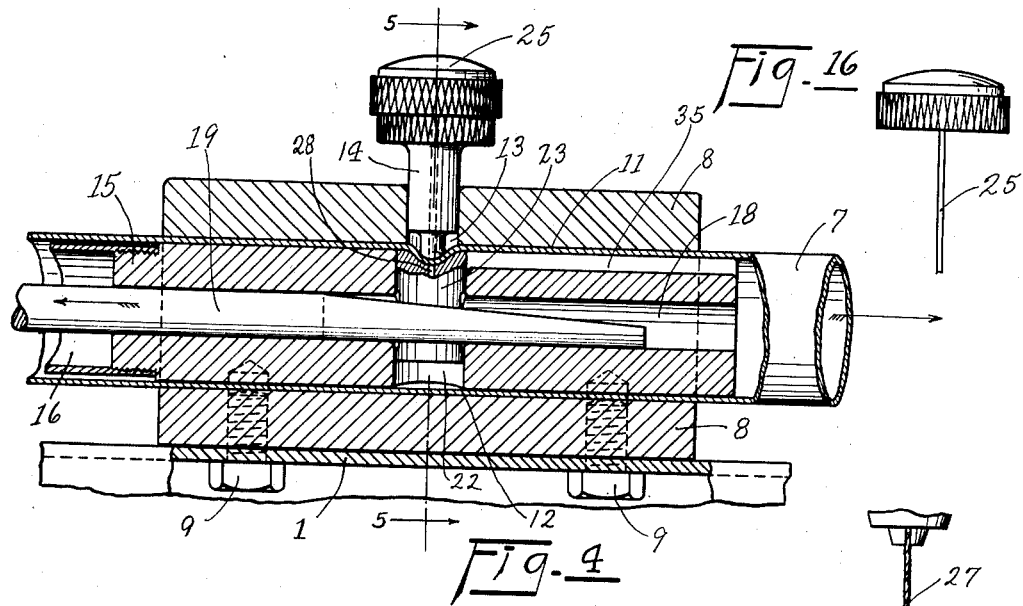
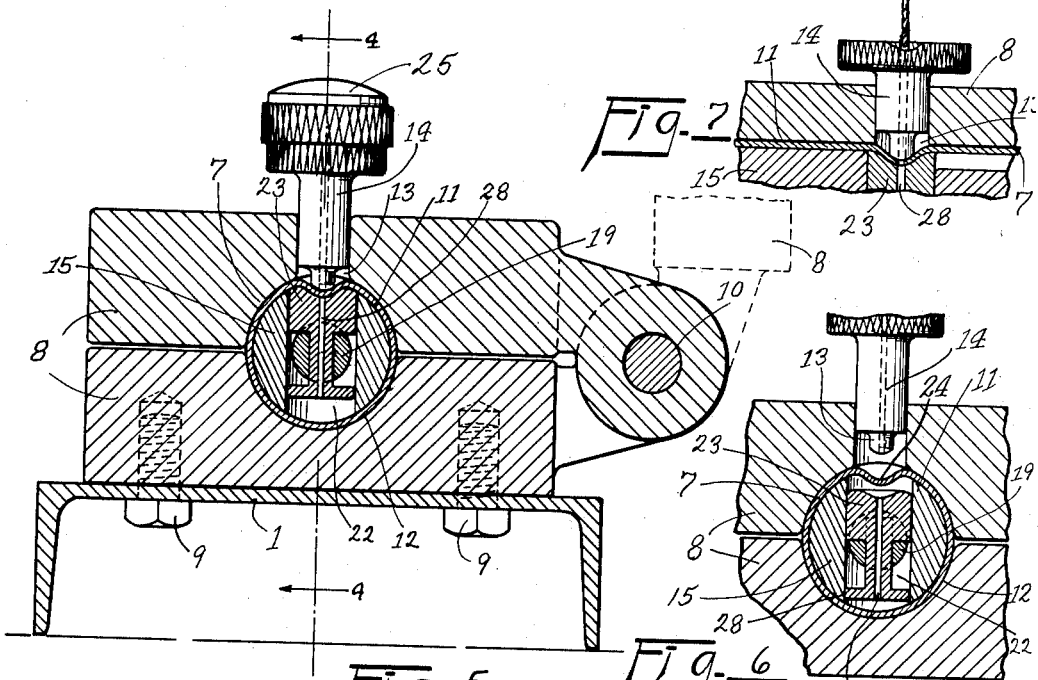
Witness:
Geo L. Chapel
Inventor
Charles O. Wilson
By Rice and Rice
Attorneys June 12, 1934.  C. O. WILSON  1,962,543
DIE STRUCTURE
Filed June 9, 1933  3 Sheets-Sheet 3
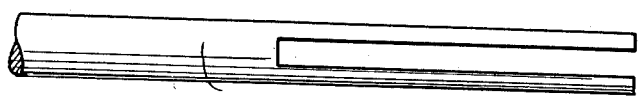
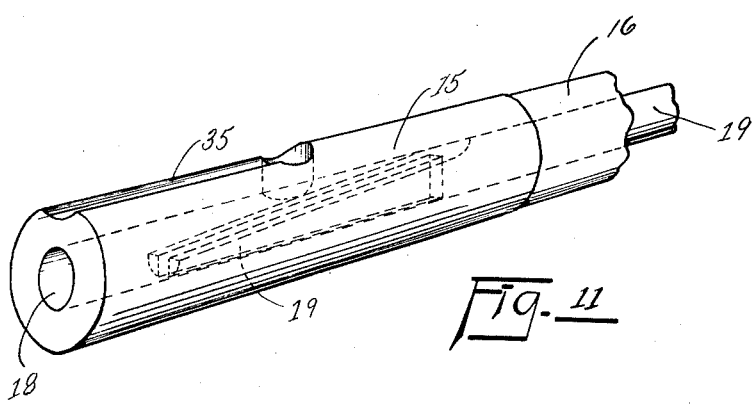
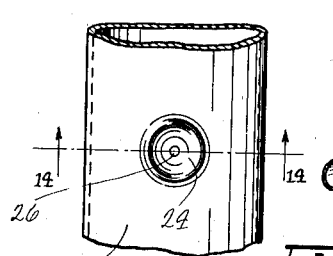
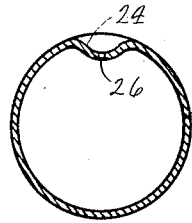
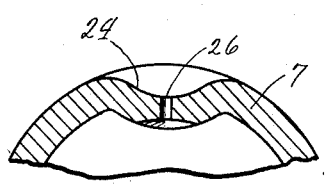
Witness:
Geo L. Chapel
Inventor
Charles O. Wilson
By Rice and Rice
Attorneys Patented June 12, 1934

1,962,543

UNITED STATES PATENT OFFICE 1,962,543

DIE STRUCTURE

Charles O. Wilson, Muskegon, Mich.

Application June 9, 1933, Serial No. 675,061

18 Claims. (Cl. 153—48)

The present invention relates to irrigation conduits and more particularly to a die structure for manufacturing irrigation conduits having integrally-formed water-emitting jets.

The main objects of the invention are to provide a sheet metal irrigation conduit having linear spaced water-emitting jets; to provide such a structure whose jets are integrally formed from the sheet metal tubing; to provide a die for manufacturing an irrigation conduit from sheet metal tubing having jets of the character above indicated; and, to provide an economical irrigation conduit of sheet metal tubing whose water-emitting jets are formed by a novel die structure.

An illustrative embodiment of the invention is shown in the accompanying drawings, wherein:

Figure 1 is a top plan view of the die structure for manufacturing the irrigation conduit from sheet metal tubing;

Figure 2 is a side elevational view thereof;

Figure 3 is an end elevational view;

Figure 4 is a sectional view of the die structure per se on line 4—4 of Figure 5;

Figure 5 is a sectional view thereof on line 5—5 of Figure 4;

Figure 6 is a fragmentary view of a portion of the die structure shown in Figure 5 but with the die members separated after the concavo-convex indentation has been formed on the surface of the sheet metal tubing;

Figure 7 is a fragmentary view showing one of the die members shown in Figure 6 with its plug removed to permit insertion of the drill for locating the water-emitting jet to be drilled;

Figure 8 is a fragmentary top plan view of the plunger for operating one of the die members;

Figure 9 is a fragmentary side elevational view thereof;

Figure 10 is an end elevational view of the plunger as seen in Figure 9;

Figure 11 is a perspective view of the mandrel;

Figure 12 is a perspective view of a finished section of the irrigation conduit;

Figure 13 is an enlarged fragmentary portion of the finished conduit;

Figure 14 is a sectional view thereof on line 14—14 of Figure 13;

Figure 15 is an enlarged fragmentary view of a modified type of water-emitting jet for the conduit; and Figure 16 is a view of the plug withdrawn from one of the die members.

Referring to the drawings in which like parts are designated by the same numerals in the several views, the die structure generally comprises a track 1, here shown as a channel bar, at one end of which is mounted a bifurcated lever 2 whose oppositely spaced ends 3 are pivotally connected to the channel bar track by a pivot pin 4 running through the depending flanged portions thereof.

A pair of spaced coupling members 5, 6 are longitudinally slidably mounted on the track and are adapted to detachably secure a sheet metal tube 7 of brass, copper or the like between them. A work-holding element or block 8 is rigidly secured at its base to the channel bar track substantially midway thereof as by the machine screws 9, the upper portion of the block being pivotally mounted to the base portion thereof adjacent their respective sides by the pintle 10.

Each half of the block is provided with a groove 11, 12, each groove being in registration to slidably embrace or encircle the sheet metal tube 7 when the upper and base portions of the block are closed to folded position as shown in full lines in Figure 5.

The upper half of the block 8 is provided with a vertically disposed bore 13 extending therethrough to its tube embracing groove 11 and within which bore 13 is a detachably carried piston die member 14 whose inner end is convex in form and is adapted to contact the outer surface of the tube 7 under pressure upon the head of this die member.

A mandrel 15 adapted to be inserted within the sheet metal tube 7 is secured at one end to the end of a tube 16 whose other end is connected to a bracket 17 rigidly mounted on the channel bar track in any suitable manner and forwardly of the lever 2. This mandrel 15 is provided with a longitudinally disposed bore 18 within which is a reciprocating bifurcated wedge plunger 19 connected at one end to a rod 20 extending through the tube 16 and pivotally connected at its outer end to the lever 2 through the slot 21 permitting the plunger to be reciprocated by the swinging movement of the lever 2.

The mandrel is likewise provided with a transversely disposed bore 22 registering with the bore 13 and substantially medially of the mandrel, within which is a complementary concave faced piston die member 23 having an I-shaped portion defined by its opposite sides as best shown in Figures 5 and 6. The bifurcated portion of the plunger 21 slidably embraces the I-shaped portion of the die member 23 and the wedge portion of the plunger permits elevation of the die member 23 into contact with the inner surface of the sheet metal tube 7 when the plunger is moved by the lever 2 as best indicated in Figure 4.

When the convex face of the die member 23 is thus elevated into contact with the inner surface of the tube 7 and pressure is exerted on the head of the die member 14, a concavo-convex indentation 24 is effected on the tube 7, as best shown in Figure 6, since the complementary forming surfaces of the die members 23 and 14 are respectively concave and convex, as heretofore described. The complementary surfaces of these die members may be obviously reversed if desired or they may be formed to provide the modified type of indentation shown in Figure 15.

The die member 14 is provided with a vertical bore to permit insertion and removal of the plug 25 shown in Figure 16 and when removed is adapted for locating the apertures 26 to be drilled in the concavo-convex indentations 24 as by the drill 27, the die member 23 being provided with the bore 28 registering with the vertical bore of the die member 14.

Secured to one side of the channel bar track 1 are a series of aligned spaced laterally projecting pins 29 and an arm 30 having a slot therein for hooking over any of the pins 29, is pivotally mounted to the coupling member 5 as by the pintle 31 whereby the arm may be secured to any of the series of pins 29, as shown in Figure 2, during the travel of the tube 7 secured between the slidable coupling members 5, 6.

In operation, the block 8 is unfolded to open position, as indicated in dotted lines in Figure 5, and the sheet metal tube 7 to be indented and drilled is slid over the mandrel 15 and secured at its opposite ends between the coupling members 5, 6 which as heretofore indicated are slidably mounted on the channel bar track 1. The block 8 is then folded to closed position, as shown in full lines in Figure 5, to slidably embrace the sheet metal tube 7 whose coupling members are then slid toward the left as viewed in Figures 1 and 2. The arm 30 is then swung to engage the first of the series of pins 29. The lever 2 is then swung to the position indicated in full lines in Figure 2 for elevating the die member 23 into contact with the inner side of the sheet metal tube 7 as shown in Figures 4 and 5, and pressure on the head of the die member 14 effects a concavo-convex indentation on the surface of the tube. The plug 25 of the die member 14 is then withdrawn and the drill 27 is inserted and the tube is drilled to form the first aperture 26 in the indentation 24 to form the integrally formed jets 32, as shown in Figure 12. After the aperture has been drilled as shown in Figure 7, the lever 2 is swung to the position shown in dotted lines in Figure 2 causing the die member 23 to drop as shown in Figure 6. The arm 30 is then detached from the first of the series of pins 29, the tube 7 is slid to the right as viewed in Figures 1 and 2 and the arm 30 is swung to engage the second of the series of spaced pins 29 when the above described operation is repeated and continued until the sheet metal tube is provided with a series of spaced linear and integrally formed jets 32, as indicated in Figure 12. The groove 35 in the mandrel permits the tube 7 to be slid thereover after the concavo-convex indentations have been formed and drilled, as best shown in Figure 4.

Tubing thus indented and drilled prevents formation of fins on the tubing. Tubing otherwise drilled forms such fins which direct the flow of water through the several jets in streams at varying angles.

It will thus be seen that a sheet metal tube provided with a series of spaced linear integrally formed jets adapting it for use as an economically manufactured irrigation conduit has been herein shown and described and that the die structure illustrated is efficient in operation for manufacturing irrigation conduits of the character above indicated.

While but one specific embodiment of this invention has been herein shown and described, it will be understood that numerous details of the construction may be altered or omitted without departing from the spirit of this invention as defined by the following claims.

I claim:

1. In a die structure of the class described, a block adapted to embrace a sheet metal tube, a mandrel adapted for insertion within the tube, said block having a transverse bore affording communication with the outer surface of the tube and said mandrel having a transverse bore registerable with the other bore and affording communication with the inner surface of the tube, and a die member within each bore movable toward each other for effecting a concavo-convex indentation on the surface of the tube, the die member within said first bore having a removable plug to permit drilling of an aperture within said indentation.

2. In a die structure of the class described, a block adapted to embrace a sheet metal tube, a mandrel adapted for insertion within the tube, said block and said mandrel each having registerable transverse bores, and a piston die member within each bore movable toward each other to contact the outer and inner surface of the tube for effecting a concavo-convex indentation on the surface of the tube, the die member in said first bore having a removable plug to permit drilling of an aperture within said indentation.

3. In a die structure of the class described, a block adapted to embrace a sheet metal tube, a mandrel adapted for insertion within the tube, said block and said mandrel each having registerable transverse bores spaced from each other by the wall of the inserted sheet metal tube, a piston die member for each bore, and means for elevating the die member in the second bore into contact with the inner surface of said tube whereby pressure on the die member in the first bore effects a concavo-convex indentation on the surface of the tube, the die member in the first bore having a removable plug to permit drilling of an aperture within said indentation.

4. In a die structure of the class described, a block adapted to embrace a sheet metal tube, a mandrel adapted for insertion within the tube, said block and said mandrel each having registerable transverse bores spaced from each other by the wall of the inserted sheet metal tube, a piston die member for each bore, and a plunger operatively connected with the die member in the second bore for elevating said die member into contact with the inner surface of said tube whereby pressure on the die member in the first bore effects a concavo-convex indentation on the surface of the tube, the die member in the first bore having a removable plug to permit drilling of an aperture within said indentation.

5. In a die structure of the class described, a block adapted to embrace a sheet metal tube, a mandrel adapted for insertion within the tube, said block and said mandrel each having registerable transverse bores spaced from each other by the wall of the inserted sheet metal tube, a piston die member for each bore, and a longitudinally disposed plunger within the mandrel transversely and operatively connected with the die member in the second bore for elevating said die member into contact with the inner surface of said tube whereby pressure on the die member in the first bore effects a concavo-convex indentation on the surface of the tube, the die member in the first bore having a removable plug to permit drilling of an aperture in said indentation.

6. In a die structure of the class described, a block adapted to embrace a sheet metal tube, a mandrel adapted for insertion within the tube, said block and said mandrel each having registerable transverse bores spaced from each other by the wall of the inserted sheet metal tube, a piston die member for each bore, and a longitudinally disposed plunger within the mandrel having a wedge portion transversely and operatively connected with the die member in the second bore for elevating said die member into contact with the inner surface of said tube whereby pressure on the die member in the first bore effects a concavo-convex indentation on the surface of the tube, the die member in the first bore having a removable plug to permit drilling of an aperture in said indentation.

7. In a die structure of the class described, a block adapted to embrace a sheet metal tube, a mandrel adapted for insertion within the tube, said block and said mandrel each having registerable transverse bores spaced from each other by the wall of the inserted sheet metal tube, a piston die member for each bore, the die member within the second bore having an I-shaped portion, and a longitudinally disposed plunger within the mandrel having a bifurcated wedge portion slidably embracing the I-shaped portion of the die member in the second bore for elevating the die member in the second bore into contact with the inner surface of the tube whereby pressure on the die member in the first bore effects a concavo-convex indentation on the surface of the tube, the die member in the first bore having a removable plug to permit drilling of an aperture in said indentation.

8. A mandrel having a transversely and longitudinally disposed bore therein whose inner ends are in communication, a die member within the transverse bore having an I-shaped portion, and a slidable wedge within the longitudinal bore having a bifurcated portion embracing said I-shaped portion for raising the die member by the sliding movement of the slidable wedge.

9. In a structure of the class described, a track, a pair of spaced coupling members slidably mounted on said track and adapted to detachably secure a sheet metal tube between them, a lever mounted with respect to said track, a block mounted on said track intermediate the coupling members and adapted to embrace the tube, a mandrel adapted for insertion within the tube, said block and said mandrel each having registerable transverse bores spaced from each other by the wall of the sheet metal tube, a piston die member for each bore, and a plunger pivotally connected with said lever and operatively connected with the die member in the second bore for elevating said die member into contact with the inner surface of the tube whereby pressure on the die member in the first bore effects work on the surface of the tube.

10. In a structure of the class described, a track, a pair of spaced coupling members slidably mounted on said track and adapted to detachably secure a sheet metal tube between them, a lever mounted with respect to said track, a block mounted on said track intermediate the coupling members and adapted to embrace the tube, a mandrel adapted for insertion within the tube, said block and said mandrel each having registerable transverse bores spaced from each other by the wall of the sheet metal tube, a piston die member for each bore, and a plunger pivotally connected with said lever and operatively connected with the die member in the second bore for elevating said die member into contact with the inner surface of the tube at spaced points thereon during its permitted travel whereby pressure on the die member in the first bore at such spaced points effects a series of linear spaced concavo-convex indentations.

11. In a structure of the class described, a track, a pair of spaced coupling members slidably mounted on said track and adapted to detachably secure a sheet metal tube between them, a lever mounted with respect to said track, a block mounted on said track intermediate the coupling members and adapted to embrace the tube, a mandrel adapted for insertion within the tube, said block and said mandrel each having registerable transverse bores spaced from each other by the wall of the sheet metal tube, a piston die member for each bore, and a plunger pivotally connected with said lever and having a wedge portion transversely and operatively connected with the die member in the second bore for elevating said die member into contact with the inner surface of the tube at spaced points thereon during its permitted travel whereby pressure on the die member in the first bore at such spaced points effects a series of linear spaced concavo-convex indentations, the die member in the first bore having a removable plug to permit drilling of an aperture in each of said indentations to provide jets.

12. In a structure of the class described, a track, a pair of spaced coupling members slidably mounted on said track and adapted to detachably secure a sheet metal tube between them, a lever mounted with respect to said track, a block mounted on said track intermediate the coupling members and adapted to embrace the tube, a mandrel adapted for insertion within the tube, said block and said mandrel each having registerable transverse bores spaced from each other by the wall of the sheet metal tube, a piston die member for each bore, the die member in the second bore having an I-shaped portion, and a plunger pivotally connected with said lever and provided with a bifurcated wedge portion extending into said mandrel slidably embracing the I-shaped portion of the die member for elevating the die member into contact with the inner surface of the tube at spaced points thereon during its permitted travel whereby pressure on the die member in the first bore at such spaced points effects a series of linear spaced concavo-convex indentations, the die member in the first bore having a removable plug to permit drilling of an aperture in each of said indentations to provide jets.

13. In a die structure of the class described, a block adapted to embrace a sheet metal tube, a mandrel adapted for insertion within the tube, said block having a transverse bore affording communication with the outer surface of the tube and said mandrel having a transverse bore registerable with the other bore and affording communication with the inner surface of the tube, and a die member within each bore movable toward each other for effecting work on the surface of the tube.

14. In a die structure of the class described, a block adapted to embrace a sheet metal tube, a mandrel adapted for insertion within the tube, said block and said mandrel each having registerable transverse bores, and die members within each bore movable toward each other to contact the outer and inner surface of the tube for effecting work on the surface of the tube.

15. In a die structure of the class described, a block adapted to embrace a sheet metal tube, a mandrel adapted for insertion within the tube, said block and said mandrel each having registerable transverse bores spaced from each other by the wall of the sheet metal tube, a die member in each bore, and means for elevating the die member in the second bore into contact with the inner surface of said tube whereby pressure on the die member in the first bore effects work on the surface of the tube.

16. In a die structure of the class described, a block adapted to embrace a sheet metal tube, a mandrel adapted for insertion within the tube, said block and said mandrel each having registerable transverse bores spaced from each other by the wall of the sheet metal tube, a die member in each bore, and a plunger operatively connected with the die member in the second bore for elevating said die member into contact with the inner surface of said tube whereby pressure on the die member in the first bore effects work on the surface of the tube.

17. In a die structure of the class described, a block adapted to embrace a sheet metal tube, a mandrel adapted for insertion within the tube, said block and said mandrel each having registerable transverse bores spaced from each other by the wall of the sheet metal tube, a die member for each bore and a longitudinally disposed plunger within the mandrel transversely and operatively connected with the die member in the second bore for elevating said die member into contact with the inner surface of said tube whereby pressure on the die member in the first bore effects work on the surface of the tube.

18. In a die structure of the class described, a block adapted to embrace a sheet metal tube, a mandrel adapted for insertion within the tube, said block and said mandrel each having registerable transverse bores spaced from each other by the wall of the sheet metal tube, a die member for each bore, and a longitudinally disposed plunger within the mandrel having a wedge portion transversely and operatively connected with the die member in the second bore for elevating said die member into contact with the inner surface of said tube whereby pressure on the die member in the first bore effects work on the surface of the tube.

CHARLES O. WILSON.